Patented Feb. 9, 1932

1,844,476

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

TREATMENT OF ADSORBENT EARTHS

No Drawing. Application filed July 26, 1927. Serial No. 208,657.

The present invention relates to the treatment of adsorbent earths, and refers more particularly to the treatment of fuller's earth, floridan earth, or other adsorbent earths such as Death Valley clay, bentonite, bauxite and infusorial earth, for the purpose of imparting to said earths characteristics whereby the efficiency of the earths in the refining of hydrocarbon oil is increased.

At the present time, adsorbent earths are coming into extensive commercial use for the purpose of refining the condensed overhead products of petroleum distillation or cracking, as well as lubricating oils, the adsorbent earth functioning as a medium to remove or convert certain deleterious compounds present in said hydrocarbon oil, such as gums, resins and certain undesirable unsaturated compounds which are formed as the result of the reaction, all of which compounds tend to impart to the product an undesirable odor or color, or both, on standing; in other words, unless these compounds are removed or converted, the hydrocarbon oil may not be sufficiently stable or otherwise satisfactory for commercial use.

I have found that the use of adsorbent earths is helpful in the refining of hydrocarbon oils for the purpose of rendering them more stable, and I have found particularly that fuller's earth and floridan earth, used naturally as mined, possess characteristics which, to a limited degree, only assist in this process of stabilization or refining.

The present invention is directed specifically to the novel concept whereby, by subjecting the fuller's earth, floridan earth, or other adsorbent earths listed above, to treatment with dilute hydrofluoric acid, it is possible materially to increase the efficiency of said earths in the refining and stabilization of hydrocarbon oils. The action of hydrofluoric acid seems to impart characteristics to the earths which tend in a manner to activate said earths. In other words, natural adsorbent earths, such as those above referred to, are not highly active in the sense that this term is used in the oil refining industry, but I have found that the action of the hydrofluoric acid tends to activate said earths, making them commercially useful and increasing the efficiency of said earths for this particular use.

The hydrofluoric acid is preferably used in concentrations of 1% down to .02%, more or less, with success. It will be instantly obvious that the expense involved in activating or increasing the efficiency of adsorbent earths for the particular use described is small. As a specific illustration of one manner of carrying out the invention, a solution may be made up comprising .02% hydrofluoric acid in aqueous solution. This is equivalent to one gallon of commercial hydrofluoric acid diluted with 5,000 gallons of water. This solution may then be used for the treatment of approximately 40,000 pounds, more or less, of adsorbent earth, the earth and solution being mixed in, say, equal proportions. The mixture may be preferably heated by steam coils or any other means and the water removed by filtration or evaporation and the earth subsequently dried. Before use, it may be desirable to regrind the earth to a finely divided state, or to any mesh desirable for use.

The earth is then ready to be used as the refining agent and will be found to possess high efficiency for the particular use described.

The action of the hydrofluoric acid on the adsorbent earth is probably an etching action, as hydrofluoric acid is the only generally known acid which will react with siliceous matter.

I claim as my invention:

1. A process which comprises subjecting natural adsorbent earth to the action of dilute hydrofluoric acid to increase the efficiency of the adsorbent earth for refining purposes.

2. A process which comprises subjecting a natural adsorbent earth to reaction with dilute hydrofluoric acid to impart thereto characteristics suitable in refining hydrocarbon oils.

3. A process which comprises subjecting a natural adsorbent earth to reaction with dilute hydrofluoric acid to impart thereto characteristics suitable in refining hydrocarbon oils, said hydrofluoric acid being used in concentrations below three per cent.

4. A process which comprises subjecting a natural adsorbent earth to reaction with dilute hydrofluoric acid to impart thereto characteristics suitable in refining hydrocarbon oils, said hydrofluoric acid being used in concentrations below one per cent.

5. Natural adsorbent earth characterized by a structure induced by the etching action of hydrofluoric acid.

6. Natural adsorbent earth having the characteristics of having been subjected to reaction with dilute hydrofluoric acid.

7. The method of treating substantially carbon-free, natural mineral adsorbent earths, which comprises subjecting these materials to the action of dilute hydrofluoric acid to increase the efficiency of the material for the purpose of refining the condensed overhead products of petroleum distillation or cracking, as well as lubricating oils.

8. A material for use in refining hydrocarbon oil of a medium to remove deleterious compounds such as gum, resin and unsaturated compounds, thereby improving the odor and color of the hydrocarbon oil; which material is produced by subjecting substantially carbon-free, natural mineral adsorbent earths to the action of dilute hydrofluoric acid.

9. A process for improving the refining characteristics of fuller's earth which comprises subjecting the same to the action of dilute hydrofluoric acid.

10. A refining agent comprising fuller's earth treated with dilute hydrofluoric acid.

In testimony whereof I affix my signature.

JACQUE C. MORRELL.